May 21, 1968 W. E. McCOWN ETAL 3,384,469
INTERNALLY COOLED HOT GLASS CONTACTING ROLL
Filed March 5, 1965 3 Sheets-Sheet 1

INVENTORS
William E. McCown and
BY Richard E. Warren

Nobbe & Swope
ATTORNEYS

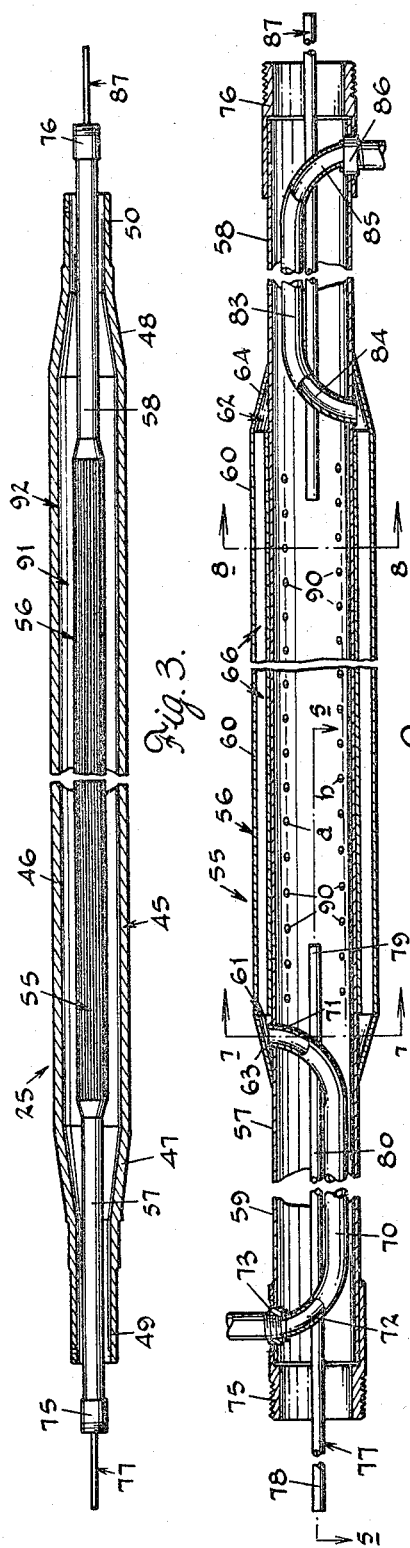
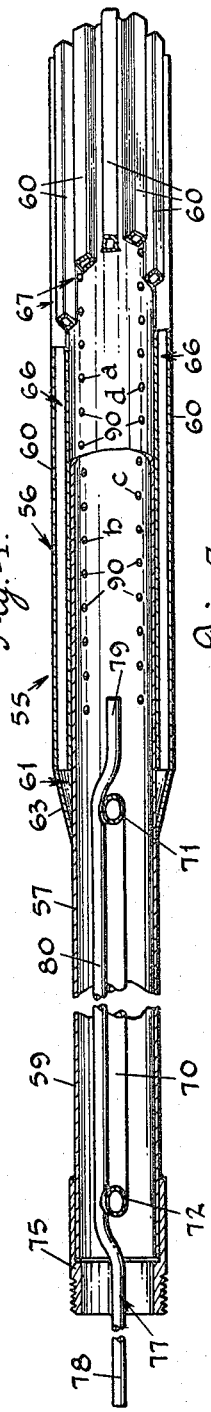
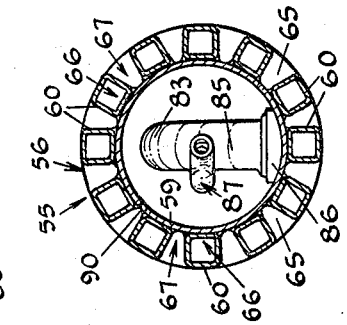
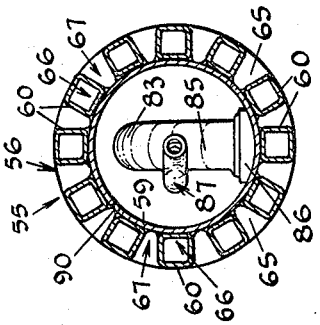
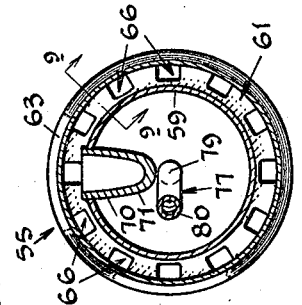
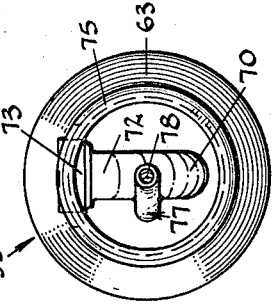
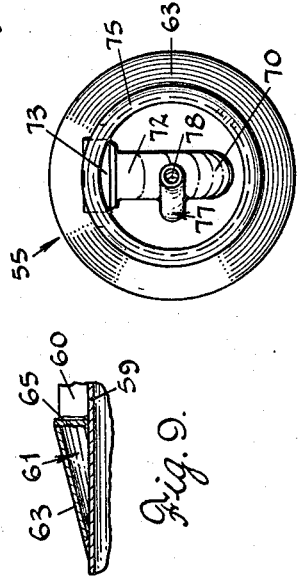

May 21, 1968  W. E. McCOWN ETAL  3,384,469
INTERNALLY COOLED HOT GLASS CONTACTING ROLL
Filed March 5, 1965  3 Sheets-Sheet 3

INVENTORS
William E. McCown and
Richard E. Warren
BY
Nobbe & Swope
ATTORNEYS

United States Patent Office 3,384,469
Patented May 21, 1968

3,384,469
INTERNALLY COOLED HOT GLASS
CONTACTING ROLL
William E. McCown and Richard E. Warren, Toledo, Ohio, assignors to Libbey-Owens-Ford Glass Company, Toledo, Ohio, a corporation of Ohio
Filed Mar. 5, 1965, Ser. No. 437,380
14 Claims. (Cl. 65—193)

ABSTRACT OF THE DISCLOSURE

An internally cooled roll of particular utility for use in contact with hot glass. The roll comprises an elongated hollow body and an elongated conduit mounted concentrically therein in spaced relation thereto to form a longitudinally extending annular passage therebetween, with said conduit having openings communicating with the interior of the body. Extending lengthwise of the conduit are a plurality of spaced longitudinal passageways adjacent said openings. A temperature controlling fluid is circulated through said passageways and a separate temperature controlling fluid is also supplied to the conduit, from which it passes through the openings therein into said body and thence outwardly from the opposite ends thereof, means being provided for exhausting the temperature controlling fluid from said passageways.

---

The present invention relates broadly to the manufacture and/or processing of glass, and more particularly to an improved construction of internally cooled roll for use in contact with hot glass.

An important object of this invention is to provide improved temperature control for rolls that are normally employed in moving contact with a highly heated body.

Another object is the provision of an improved cooler for directing a cooling medium through the interior of a roll to control the temperature of the working surface of the roll.

A further object is the provision of an internally cooled roll having improved cooler construction that utilizes a plurality of cooling fluids.

A still further object is to provide cooler means of the above character located interiorly of a stationary or rotatable roll for directing a temperature controlling medium along a predetermined path in contact with the inner surface of the roll casing to substantially uniformly absorb heat from the working surface of the roll and thus prevent overheating thereof and the occurrence of "hot" spots axially therealong while a sheet of relatively hot glass or other heated body is in contact with such working surface.

Other objects and advantages of the invention will become more apparent during the course of the following description when read in connection with the accompanying drawings.

In the drawings wherein like numerals are employed to designate like parts throughout the same:

FIG. 3 is a similar view of the roll and cooler alone;

FIG. 4 is a longitudinal cross-section of the bending roll cooler;

FIG. 5 is a longitudinal cross-section of the cooler as taken on line 5—5 of FIG. 4;

FIG. 6 is a view of one end of the cooler;

FIG. 7 is a transverse, vertical section taken on line 7—7 of FIG. 4;

FIG. 8 is a transverse, vertical section taken on line 8—8 of FIG. 4;

FIG. 9 is a fragmentary sectional detail taken on line 9—9 of FIG. 7;

Figure 1:
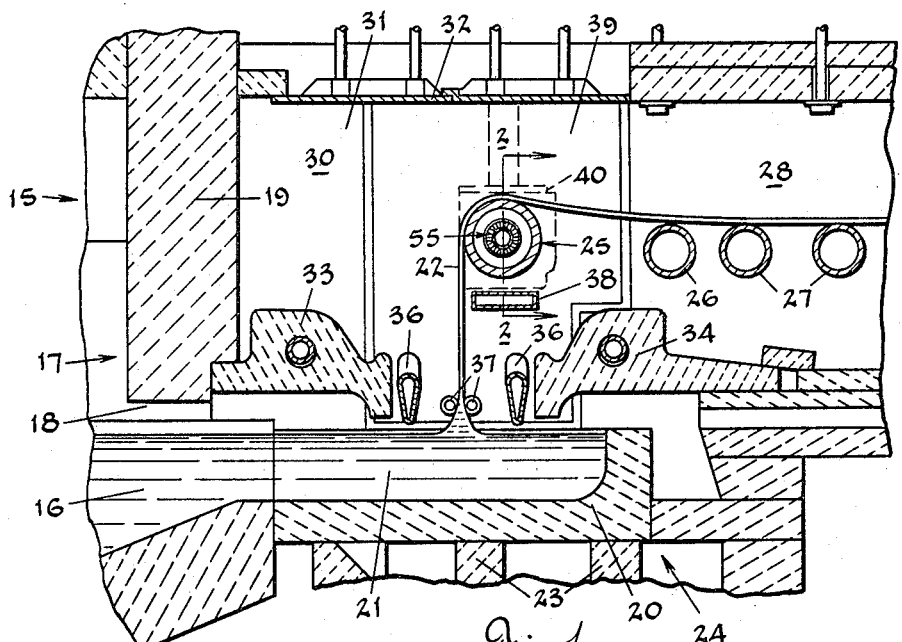
FIG. 1 is a longitudinal, vertical cross-section through the drawing chamber of a sheet glass furnace including a glass sheet supporting or bending roll and cooler constructed in accordance with the invention.

Although the invention is not restricted to any particular use, it has to date been proven particularly advantageous in producing sheet glass on machines of the so-called Colburn type. Indeed its application to the bending rolls of such machines has resulted in greater drawing speeds and notably decreased distortion in the finished glass. Therefore, the invention will be specifically described in that connection here.

With reference now more particularly to the drawings, the numeral 15 designates generally the outlet end of a continuous tank furnace in which a mass of molten glass is provided, refined and cooled to proper working temperature. The molten glass, indicated by the numeral 16, flows from the cooling chamber 17 of the furnace beneath the outlet arch 18 of an end wall 19 and into a working receptacle or draw-pot 20 to form a relatively shallow pool of molten glass 21 from which a sheet or ribbon 22 can be continuously drawn. To maintain the pool of molten glass 21 at the desired working temperature, the draw-pot 20 is mounted on stools 23 in an enclosed pot chamber 24 which is heated by suitable heaters (not shown) and connected by ducts to an exhaust stack.

The sheet or ribbon 22, being held to width by edge rolls 37, is continuously drawn upward from the surface of the pool of molten glass 21 and, while still in a semiplastic condition although substantially set in its final sheet form, is deflected into the horizontal plane about a support or bending roll, generally designated by the numeral 25, and then passes over an idler roll 26 onto rolls 27 situated in a flattening chamber 28 and into and through an annealing lehr (not shown).

A forming or drawing chamber, generally designated by the numeral 30 and defined by the end wall 19, oppositely disposed side walls 31, one being shown in FIG. 1, and a roof 32, is provided with front and rear lip-tiles 33 and 34, respectively, which function to direct any rising currents of hot air or other gases downwardly toward the surface of the molten glass 21 and thereby substantially separate the area immediately above the draw-pot from the drawing chamber 30.

The bending roll 25 is located in the drawing chamber and comprises an elongated hollow body or shell 45 having a cylindrical central portion 46 and terminating in generally tapered end portions 47 and 48 having outermost end sections 49 and 50 which extend through openings in side walls 31 and are received in bearing casings 40 and 41, respectively. The side walls 31 are also provided with suitable side openings for mounting sheet coolers 36, pairs of knurled rods 37 and a bending roll cooler 38, such openings being sealed by enclosure panels 39. The bearing casing 40, FIG. 2, may include conventional gearing adapted to drive the roll when necessary.

Because the glass in the plastic sheet or ribbon 22, when it passes over the bending roll 25, is at a temperature in the range of 1250 to 1300 degrees Fahrenheit, it is necessary that the roll 25 be cooled internally and, heretofore, this has usually been done by the provision of a bending roll cooling pipe arranged axially within the roll and through which air or water is continuously supplied.

This type of conventional internal cooling means was used and considered to be commercially satisfactory for a great many years. However, with the ever increasing present day demands for higher speeds in sheet glass machines and higher quality in the product produced thereon, the prior art bending roll cooling means came to represent a distinct obstacle in the path of progress for two reasons.

First, they definitely limited the speed at which the ribbon or sheet could be drawn from the mass of molten glass in the working receptacle because when the speed was increased beyond a certain point the roll ran "hot" resulting in sticking of the glass to the roll.

Secondly, in addition to failing to provide adequate cooling for the bending roll at high speeds, the prior art cooling means failed to give sufficiently uniform cooling of the roll surface from end to end which resulted in alternate hot and cold spots and streaks and serious temperature differentials in the sheet which have been found to be one of the primary causes of distortion defects in the finished glass.

According to the preferred embodiment of the present invention, however, there is provided a novel form of internally cooled bending roll and more specifically a novel type of cooling means for such roll which includes a hollow tubular member or body having a cooling fluid under relatively low pressure introduced to opposite ends thereof with openings between the opposite ends of the body or conduit to allow the fluid to enter a passage adjacent the inner surface of the bending roll and flow along the inner surface of the roll thereby equalizing the temperature of the working surface. A plurality of spaced tubular members are provided on the outer surface of the conduit adjacent the openings which carry a second cooling medium that will additionally cool the first cooling fluid as well as providing additional cooling for the passage. There is additionally provided, a means for selectively introducing a third cooling fluid into the central area of the hollow tubular member providing additional flow when desired to eliminate "hot" spots on the roll whenever they occur.

In accordance with the preferred embodiment of the invention shown in FIGS. 3–9, the roll or hollow body 25 is provided with an elongated tubular cooler member 55 having an enlarged central portion 56 disposed concentrically within the middle portion 46 of the roll. Upon reference to FIG. 3, it will be seen that the enlarged central portion 56 terminates inwardly of the tapered end portions 47 and 48 of the bending roll and that the cooler 55 per se extends outwardly therefrom through the outermost end sections 49 and 50 in the form of cylindrical end sections 57 and 58. In this connection, it will be appreciated that the length of the central portion 46 of the bending roll and the related length of the portion 56 of the cooler 55 depends upon the desired length of working surface desired for the width of the glass ribbon 22 moving thereabout.

More particularly, the cylindrical end sections 57 and 58 are integral extenions of a tubular member or pipe 59 forming the actual body portion of the cooler. Likewise, the structural elements forming the aforementioned enlarged central portion 56 are carried by the pipe 59 and include a plurality of substantially rectangular tubes or conduits 60 which, as viewed in FIG. 8, are arranged radially about the surface of pipe 59 in equally spaced relation to one another. Considered in its broadest aspects, the invention contemplates the provision of a plurality of such tubes or enclosed passageways with the number of radially spaced tubes and the cross-sectional area thereof being adapted to modification. In other words, the number and arrangement of the tubes 60, illustrated in FIG. 8, can be varied and the cross-sectional area thereof correspondingly modified to provide the desired amount of colant adjacent the inner surface of the roll.

The ends of the tubes 60 terminate in chambers 61 and 62 that are defined by cylindrically tapered sleeves or walls 63 and 64; the inner edges of the walls 63 and 64 being sealed to the adjoining end surfaces of the top walls of the tubes 60 and the outer edges of said walls being similarly sealed to the surface of the pipe 59. The open spaces between the ends of the tubes are closed by suitably formed plates 65 as in FIG. 9. There is therefore provided a plurality of radially spaced, closed passageways 66 within tubes 60 and upwardly directed substantially open passageways or channels 67 alternately provided between the passageways 66 and formed by and between the outer side wall surfaces of the tubes 60. In this structure, the tubes 60, walls 63 and 64 and plates 65 are integrally fixed to one another and the pipe 59 as by welding or like processes.

The chamber 61 at one end of the tubes 60 communicates with a source of coolant, such as water, and the chamber 62 similarly is connected to a source; these being understood to be a source of fluid supply under pressure and a source for discharge or drainage. As shown in FIGS. 4, 6 and 7, a suitably contoured pipe 70 is passed through the wall of pipe 59 and the arcuately bent end 71 terminates in the chamber 61 defined by the tapered wall 63. The oppositely reversely bent end 72 of pipe 70 is sealed to a pipe fitting 73 that passes through and is sealed to the wall of pipe 59 adjacent one outer end thereof. Generally speaking, the ends of pipe or sleeve 59 are provided with tubular, externally threaded pipe connections 75 and 76. Supported on the bent ends 71 and 72 of pipe 70 is a length of tubing 77 which has an outer end section 78, concentric with the axis of pipe 59, an inner end section 79 and an intermediate section 80, the wall of which is attached to wall surface of said sections 71 and 72 and which is suitably shaped to return, as in FIGS. 5, 6 and 7, into the axially disposed end sections 78 and 79.

A pipe 83 opening into oppositely disposed chamber 62, defined by the tapered wall 64, is similarly bent, as at 84 and 85, at its respective ends to pass through the wall of pipe 59 and to be fixed to a pipe fitting 86. As viewed in FIG. 4, the pipe 70 communicates with the upper area of the chamber 61 while pipe 83 communicates with the lower area of chamber 62. In the same manner as the tube 77 is assembled to the pipe 70, a tube 87 is associated with the pipe 83.

Within the area of the cooler spanned by the lengths of the upward or outwardly open channels 67, the pipe 59 is perforated or provided with rows of holes or openings 90. As viewed in FIGS. 5 and 8, the rows of holes are located in channels 67 that are radially spaced from one another about the surface of the pipe and are adapted to distribute air into the annular passageway 91 defined by the inner surface 92 of the bending roll and the outer surface of the cooler. The holes in each of the rows, designated a, b, c and d in FIGS. 4 and 5, are in staggered relation with holes in adjacent rows. Thus, in any given cross-sectional view of cooler 55, such as 8—8, only one hole 90 will be seen. The arrangement of holes as described will provide a spiral path on the sleeve 59 to more uniformly emit the outwardly flowing air against the wall of the roll. Although the invention disclosed contemplates four rows of openings, it is considered within the scope of the invention to vary the number of rows according to the desired needs.

Since in actual operation the roll normally revolves with the glass sheet moving thereover, the effect of the cooling air will be evenly distributed along the wall of the central area 46 of the roll as distinct from a situation in which the holes are located in spaced circularly arranged rows as well as longitudinally with regard to one another.

Figure 2:
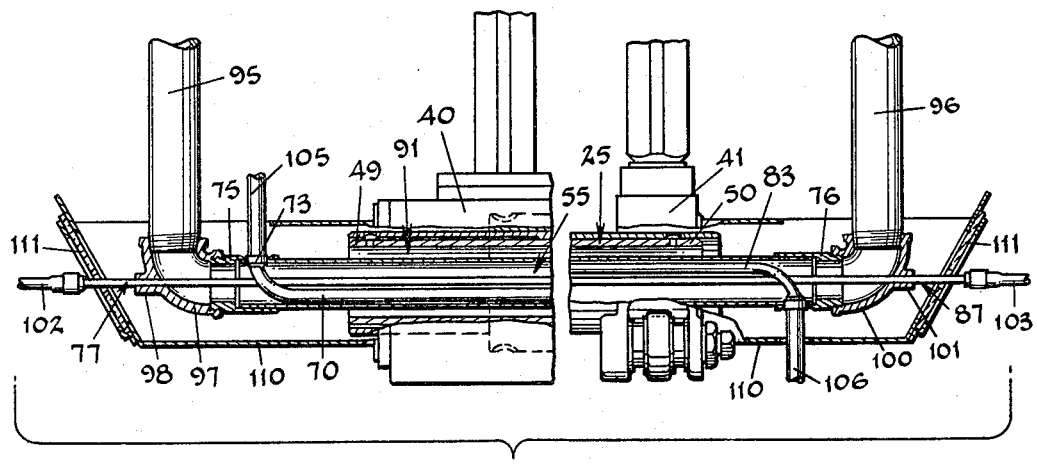
FIG. 2 is a longitudinal, vertical sectional view taken on line 2—2 of FIG. 1 and illustrating mountings for the respective ends of the roll and cooler.

Referring now to FIG. 2, the bending roll 25 is, as aforementioned, mounted at one end, as at 49, in the casing 40 and at the other end 50 in the casing 41; both of these casings being conventionally supported in one way or another on the structural framework of the furnace.

The bending roll cooler 55, after being passed through the roll 25, is supported at its ends by means of pipes 95 and 96 that are also carried by the structural framework and connected to a source of air under relatively low pressure. To this end, the pipe connector 75 is provided with a pipe elbow 97 having an apertured boss 98 through which the tube 77 is inserted as the elbow is turned inwardly on the threaded surface of the connector. As well, the pipe connector 76 is provided with an elbow 100 having boss 101 for insertion of the tube 87. The tubes 77 and 87 are connected to a controlled source of air under pressure by pipes or flexible tubings 102 and 103. The pipe 95 thus is threadedly connected to the opposite end of the elbow 97 and the pipe 96 similarly connected to the elbow 100. When the cooler 55 is bodily located with the casing 45 of the bending roll, the pipes 95 and 96 by conventional support means (not shown) are adapted to be raised or lowered to position the cooler in coaxial relation to the roll. Further, a supply pipe 105 is connected to the pipe fitting 73 and a pipe 106 to the pipe fitting 86.

In actual practice, the pipes 95 and 96 are connected to a source of relatively low pressure air; i.e. 2 to 4 p.s.i., and direct the same into the opposite ends 57 and 58 of the pipe 59. The air thus flows into the vicinity of the plurality of holes 90 and outwardly therethrough into the passageway 91 to contact the inner surface 92 of the roll. During this movement of air through the pipe 59, it is subjected to the cooling influence of the coolant medium, such as water, circulating through the passageways 66 of the tubes 60. This cooling influence is also exercised outwardly through the exposed wall surfaces of the tube to reduce the temperature of the air by convection and conduction cooling in the annular passageway 91 as this air absorbs heat from the wall of the bending roll. The cooling surfaces of the tubes 60 also serve to increase the cooling influence of the air directed into the passageway 91 from holes 90 as well as maintaining the air in the conduit 59 at a lower temperature. As hereinabove discussed, this serves to accurately control the temperature of the bending roll and maintain the same in the range desired due to the direct contact of the newly-formed glass ribbon with the outer surface thereof.

The efficiency of the coolant is suitably controlled by the rate of continuous flow from the pipe 105 through pipe 70 and tubes 60 to pipe 83 into drain pipe 106. And, as the air within passageway 91 expands along the surface 92 of the bending roll due to the increase in pressure, the further quantities of relatively cool air continuously being supplied through the holes 90, causes the heated air currents to flow outwardly toward and exhaust from the open ends of the bending roll. To directively guide these exhausting currents of hot air, means, such as the sheet metal shields 110, are mounted on the outwardly directed surfaces of the bearing cases 40 and 41. These shields, may be substantially U-shaped or circular and can, if desired, be provided with viewing openings, covered by glass panels 111, to permit inspection of the interior of the bending roll.

In the event the roll begins to run "hot," the flow of air from the cooler, through the passage 91 and outwardly from the open ends of the bending roll may be accelerated by additional air provided through the tubes 77 and 87. This air is supplied at pressures as from 55 to 60 pounds and serves as an inspirating force to the air within the pipe 59 and supplied by the pipes 95 and 96. In consequence, the amounts of air entering the passageway 91 are proportionally increased for short intervals of time to purge the heated air from within the passageway and thereby bring about a more rapid cooling of the bending roll until the temperature thereof is reduced to within the desired range of working temperature.

Figure 10:
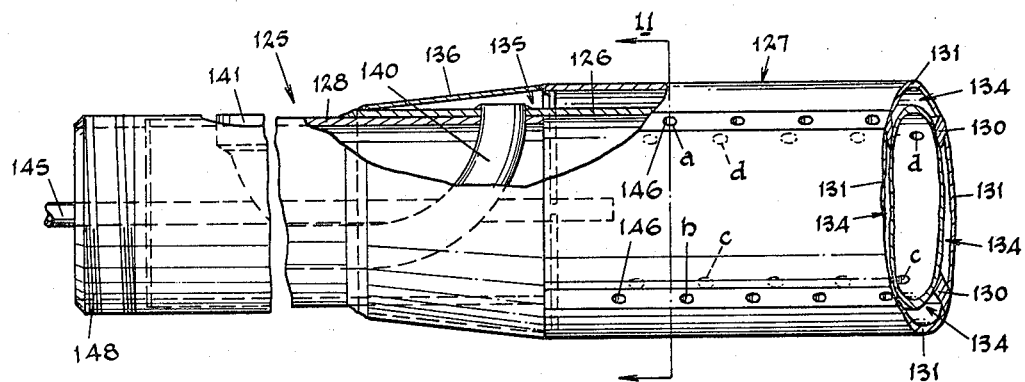
FIG. 10 is an enlarged fragmentary view partially in section showing a modified form of cooler construction.
Figure 11:
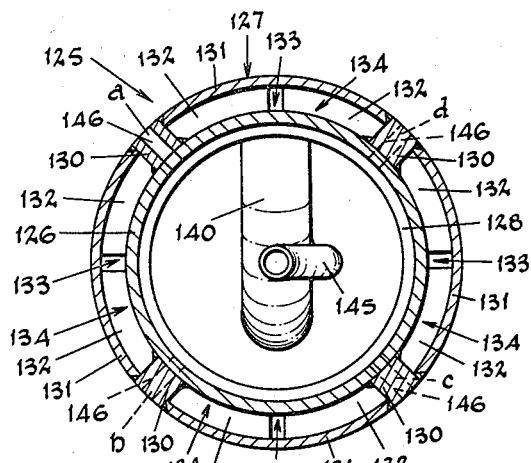
FIG. 11 is a transverse sectional view taken along lines 11—11 of FIG. 10.

A modified form of cooler construction 125 is shown in FIGS. 10 and 11. Since the opposite ends of this cooler are identical in construction to each other and to that shown in the embodiment hereinabove described, only one end has been shown. The elongated tubular cooler member 125 comprises a conduit 126 having an enlarged middle portion 127 and extensions 128 on opposite ends. The enlarged middle 127 is defined by a plurality of longitudinally extending, parallel, rectangular bars 130 secured to the outer surface of the conduit in equally spaced relation to one another and a plurality of arcuate plates 131 positioned between adjacent bars or members 130. The arcuate plates 131, adjacent surfaces of respective pairs of bars 130 and portions of the conduit 126 form generally rectangular tubes to provide a plurality of passageways 134 between respective pairs of members 130. The opposite ends of each of the passageways are partially closed with two plates 132 having their adjacent ends spaced to provide an opening 133 into the passageway. The openings 133 communicate with chambers 135 that are defined on opposite ends of the passageways by cylindrically tapered sleeves or walls 136; the inner edges of the walls being rigidly secured to the arcuate plates 131 and the outer edges secured to the conduit 126, as by welding.

As shown in FIG. 10, suitably contoured pipes 140 communicate with the chambers 135 at one end thereof with the opposite ends terminating in pipe fittings 141 that are sealed in the extensions 128. Tubes 145, similar to tubular members 77 and 87 of FIG. 4, are concentrically located within opposite ends of the conduit 126. Each of the members or bars 130 is provided with a plurality of perforations or openings 146. As can be seen in FIG. 10, the rows of openings, designated a, b, c and d, are in staggered relation with holes in adjacent rows, for a purpose described hereinabove.

The cooler constructed in accordance with this embodiment of the invention is mounted within the bending roll 25 in a manner identical to that disclosed in the preferred embodiment hereinabove. More particularly, the opposite ends of the cooler are threaded as at 148 for receiving the respective elbows 97 and 100, and the pipe fittings 141 receive a supply pipe 105 and a second or discharge pipe 106.

The operation of the modified form of cooler is similar to the operation of the cooler constructed in accordance with the preferred embodiment. More particularly, a source of relatively low-pressure air is introduced into the opposite ends of the conduit 126. The air flows through the perforations or openings 146 into the area adjacent the inner surface of the bending roll 25. A supply of cooling fluid is introduced through the supply line 105, passes through the various passageways 134 on the outer surface of conduit 125 and is discharged through the pipe 106. Also, in the event that the roll begins to run hot, additional air may be provided through the tubes 145 to purge the heated air adjacent the inner surface of the bending roll thereby providing more rapid cooling until the temperature is reduced to within the desired range of working temperature.

Although only four bars with rows of openings and four passageways have been shown, it is obvious that any number of such bars and passageways may be provided dependent upon the amount of coolant desired.

As aforementioned, either roll cooler 55 or 125 is adapted by its connection to supply pipes 95 and 96 to introduce air, at a pressure from 2 to 4 pounds, into the passageway created between the outer surface of the cooler and the inner surface of the bending roll. By providing a continuous movement of a coolant, such as water, through the passageways adjacent the outer surface of the conduit of the cooler, greater cooling will be provided in two different forms. First, the continuous flow of the coolant will keep the air supplied through the pipe or conduit and the openings of the respective embodiments at a lower temperature, thus keeping the air density higher, which will minimize the increase in volume in air and therefore will provide more effective conduction cooling over the length of the bending roll. Secondly, the several tubes of the coolant supply will act as a black body absorbing radiant heat from the inner surface of the roll.

It is to be understood that the forms of the invention herewith shown and described are to be taken as illustrative embodiments only of the same, and that various changes in the shape, size and arrangement of parts, as well as various procedural changes may be resorted to without departing from the spirit of the invention.

We claim:

1. In temperature control apparatus, a roll comprising an elongated hollow body, an elongated conduit supported concentrically within said body in spaced relation thereto to form a longitudinally extending annular passage therebetween, means on said conduit forming a plurality of spaced passageways extending lengthwise thereof, said conduit being provided with openings communicating with said body adjacent said passageways, means for supplying a temperature controlling fluid to said conduit from which it passes through said openings into the interior of said body and thence outwardly thereof, means for circulating a separate temperature controlling fluid through said passageways, and means for exhausting said temperature controlling fluid from said passageways.

2. Apparatus as defined in claim 1, in which a plurality of passageways are disposed in spaced relation around the periphery of said conduit, and said openings are located between said passageways.

3. Apparatus as defined in claim 2, in which said conduit is generally cylindrical and said passageways are formed by tubes generally rectangular in cross-section.

4. Apparatus as defined in claim 3, in which said tubes are radially arranged on and substantially equally spaced about the periphery of said conduit.

5. An apparatus as defined in claim 3, in which the tubes are radially arranged and substantially equally spaced on the outer surface of said conduit with communicating chambers at opposite ends of said tubes.

6. Apparatus as defined in claim 4, in which the openings in said conduit are arranged in spiral formation around the periphery thereof.

7. Apparatus as defined in claim 2, in which the openings in said conduit are arranged in spaced rows, each row being staggered with respect to adjacent rows, the openings forming a spiral path longitudinally on said conduit.

8. In temperature control apparatus, a roll comprising an elongated hollow body, an elongated conduit positioned within and in axial alignment with said body to form a longitudinally extending annular passage therebetween, said conduit being provided with openings for directing a cooling fluid from said conduit into the interior of said body, a plurality of longitudinally extending tubes mounted in spaced relation to one another around the periphery of said conduit with the openings in said conduit being between adjacent tubes, means for supplying a cooling fluid to said conduit from which it passes through said openings into the interior of said body and thence outwardly from the ends thereof, means for circulating a separate cooling fluid through said tubes means for exhausting the cooling fluid from said tubes, and means for mounting said body and said conduit for rotary movement of one relative to the other.

9. In combination with a roll having a cylindrical central portion, of a tubular conduit supported concentrically within said roll and extending beyond opposite ends thereof to form a longitudinally extending annular passage between said tubular conduit and the inner surface of said roll, a plurality of longitudinally extending tubes fixed to said conduit and radially spaced on the outer surface intermediate the ends thereof, communicating chambers at opposite ends of said tubes, means for directing a cooling fluid through said chambers and said tubes, and means for introducing air into said conduit, said conduit being provided with apertures for directing said air therefrom between said tubes into said passage from which it passes exteriorly of the roll.

10. The combination as defined in claim 9, including means for directing a second source of air to an area within said conduit surrounded by said tubes, said means including tubular elements extending from opposite ends of said conduit and terminating in said conduit adjacent said communicating chambers.

11. In temperature control apparatus, a roll comprising an elongated tubular body, an elongated conduit mounted in said body and spaced therefrom to form a longitudinally extending annular passage therebetween, longitudinally extending tubular members spaced radially and secured to the outer surface of said conduit, communicating chambers at opposite ends of said tubular members, means for circulating a cooling fluid through said chambers and said tubular members, means for introducing a first supply of air into the opposite ends of said conduit, said conduit being provided with apertures for directing said air through the wall of said conduit into said annular passage between said tubular members, from which it passes outwardly of said roll, and means for introducing a second supply of air to an area within said conduit surrounded by said tubular members.

12. In sheet glass drawing apparatus a bending roll, means mounting said roll for rotary movement, a conduit extending through said roll and spaced therefrom to form a longitudinally extending annular passage therebetween, said conduit having discharge openings in the wall thereof, means mounting said conduit in fixed axial relation to said roll, a plurality of tubes arranged lengthwise on the periphery of said conduit between said openings therein, means for supplying fluid to said conduit from which it passes through said openings into said annular passage and thence outwardly of said roll, and means for circulating a fluid through said tubes.

13. In temperature control apparatus, a roll comprising an elongated hollow body, a fluid conduit supported within said body and spaced therefrom to form a longitudinally extending annular passage therebetween, a plurality of longitudinally extending bars secured to and spaced on the outer periphery of the central portion of said conduit and provided with openings for directing fluid from said conduit into the interior of said body, means providing a plurality of passageways between adjacent bars on the periphery of said conduit, communicating chambers at opposite ends of said passageways, means supplying a temperature controlling fluid to said conduit from which it passes through said openings into said annular passage and thence outwardly thereof, and means for circulating a temperature controlling fluid through said chambers and said passageways.

14. Apparatus as defined in claim 13, wherein said means providing a plurality of passageways includes arcuate plates secured to adjacent surfaces of the spaced pairs of bars and pairs of plates closing the opposite ends of each of said passageways with each pair of plates being spaced to provide a communicating opening into the passageways.

References Cited

UNITED STATES PATENTS 2,144,506  1/1939  Potter _____ 165—174

DONALL H. SYLVESTER, *Primary Examiner.*

ARTHUR D. KELLOGG, *Examiner.*